(12) United States Patent
Samson et al.

(10) Patent No.: US 8,314,806 B2
(45) Date of Patent: Nov. 20, 2012

(54) LOW POWER DISPLAY MODE

(75) Inventors: Eric Samson, Folsom, CA (US); Aditya Navale, El Dorado Hills, CA (US); Todd Witter, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 11/322,880

(22) Filed: Apr. 13, 2006

(65) Prior Publication Data

US 2007/0242076 A1 Oct. 18, 2007

(51) Int. Cl.
G09G 5/39 (2006.01)

(52) U.S. Cl. ........................................................ 345/531

(58) Field of Classification Search .................. 345/519, 345/531
See application file for complete search history.

(56) References Cited

U.S. PATENT DOCUMENTS

| | | | | |
|---|---|---|---|---|
| 5,615,376 A * | 3/1997 | Ranganathan | ................ | 713/322 |
| 5,757,365 A * | 5/1998 | Ho | ................. | 345/212 |
| 5,778,237 A * | 7/1998 | Yamamoto et al. | ........... | 713/322 |
| 5,860,016 A * | 1/1999 | Nookala et al. | ............... | 713/324 |
| 5,881,016 A * | 3/1999 | Kenkare et al. | .......... | 365/230.03 |
| 5,941,968 A * | 8/1999 | Mergard et al. | ............... | 710/308 |
| 5,987,244 A * | 11/1999 | Kau et al. | ....................... | 713/500 |
| 5,991,883 A * | 11/1999 | Atkinson | ...................... | 713/300 |
| 6,079,024 A * | 6/2000 | Hadjimohammadi et al. | ............................ | 713/322 |
| 6,088,806 A * | 7/2000 | Chee | ................................ | 713/322 |
| 6,151,681 A * | 11/2000 | Roden et al. | .................... | 713/322 |
| 6,189,064 B1 * | 2/2001 | MacInnis et al. | ............. | 710/244 |
| 6,460,125 B2 * | 10/2002 | Lee et al. | ....................... | 711/167 |
| 6,633,987 B2 * | 10/2003 | Jain et al. | ....................... | 713/300 |
| 6,657,634 B1 * | 12/2003 | Sinclair et al. | ................ | 345/534 |
| 6,678,834 B1 * | 1/2004 | Aihara et al. | .................. | 713/501 |
| 6,691,236 B1 * | 2/2004 | Atkinson | ....................... | 713/320 |
| 6,848,058 B1 * | 1/2005 | Sinclair et al. | ................ | 713/322 |
| 6,928,559 B1 * | 8/2005 | Beard | ............................. | 713/300 |
| 6,971,034 B2 | 11/2005 | Samson et al. | | |
| 7,089,438 B2 * | 8/2006 | Raad | ............................. | 713/322 |
| 7,103,730 B2 | 9/2006 | Saxena et al. | | |
| 7,114,086 B2 * | 9/2006 | Mizuyabu et al. | ............. | 713/320 |
| 7,149,909 B2 | 12/2006 | Cui et al. | | |
| 7,222,253 B2 | 5/2007 | Samson et al. | | |
| 7,343,502 B2 | 3/2008 | Samson et al. | | |
| 7,343,508 B2 * | 3/2008 | Khodorkovsky | .............. | 713/500 |
| 7,538,762 B2 | 5/2009 | Fletcher et al. | | |
| 7,613,941 B2 | 11/2009 | Samson et al. | | |
| 2004/0139359 A1 * | 7/2004 | Samson et al. | ................ | 713/320 |
| 2005/0195181 A1 * | 9/2005 | Khodorkovsky | .............. | 345/211 |
| 2006/0146852 A1 | 7/2006 | Munagala et al. | | |
| 2006/0187226 A1 * | 8/2006 | Bruno et al. | ................... | 345/534 |

OTHER PUBLICATIONS

Intel Technology Journal, "innovation Brings Low Power Integrated Graphics to the Intel®, Centrino™, Mobile Technology Platform", vol. 7, Issue 2, Published, May 21, 2003, ISSN 1535-864X, pp. 16-20.

* cited by examiner

*Primary Examiner* — Edward Martello
(74) *Attorney, Agent, or Firm* — Blakely, Sokoloff, Taylor & Zafman LLP

(57) ABSTRACT

A controller is described that includes wiring to transport notification that a FIFO that holds data to be used to display content on a display has reached a threshold. The controller also includes first control circuitry to turn on a phase locked loop (PLL) circuit to cause logic circuitry within the controller downstream from the PLL to begin to receive a first clock in response to the notification. The logic circuitry is to transport data read from a memory toward the FIFO. The controller also includes second control circuitry to cause the memory to use a second clock provided by the controller in response to the notification.

14 Claims, 5 Drawing Sheets

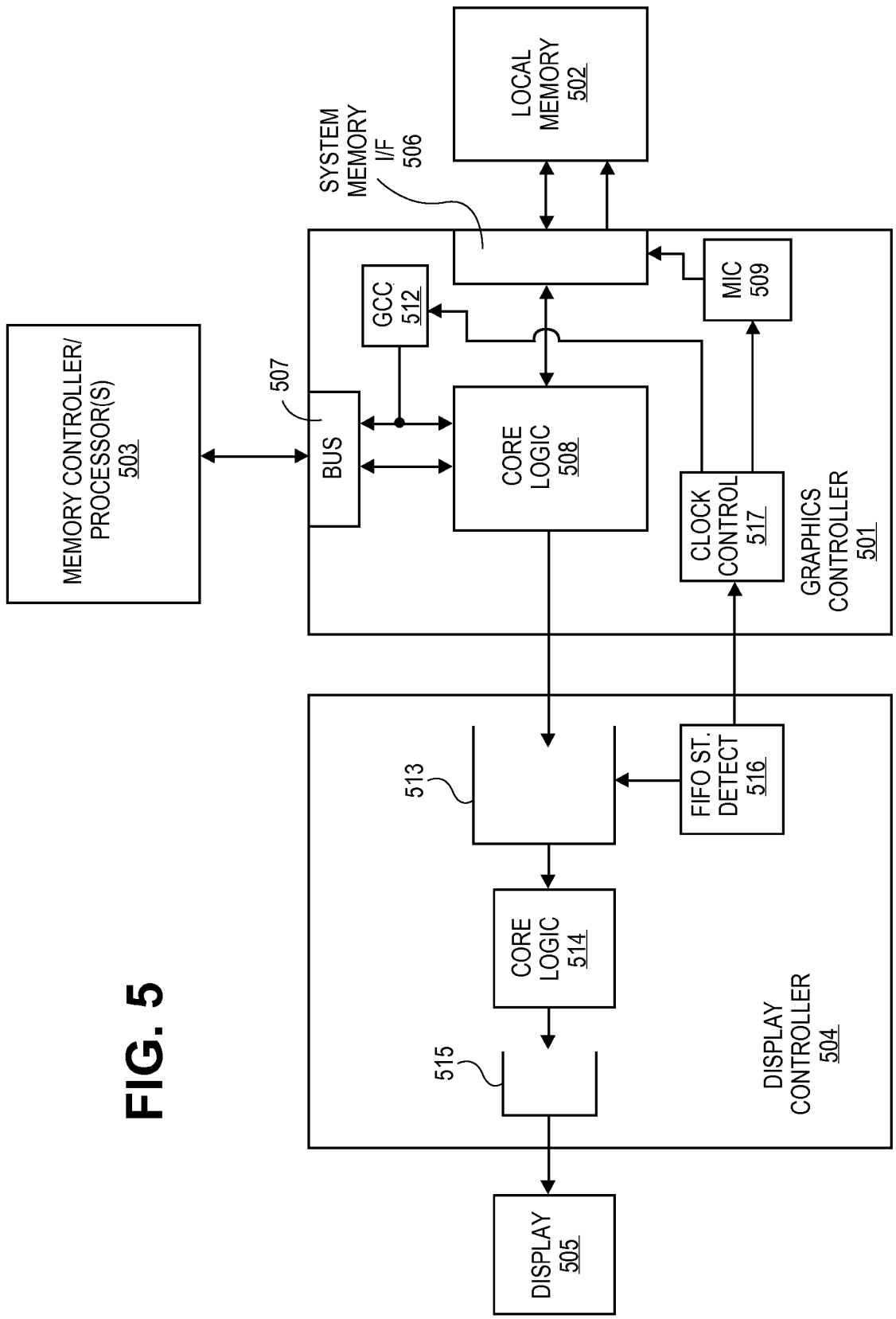

LOW POWER DISPLAY MODE

FIELD OF INVENTION

The field of invention relates generally to the computing sciences, and, more specifically, to a low power display mode.

BACKGROUND

Figure 1:
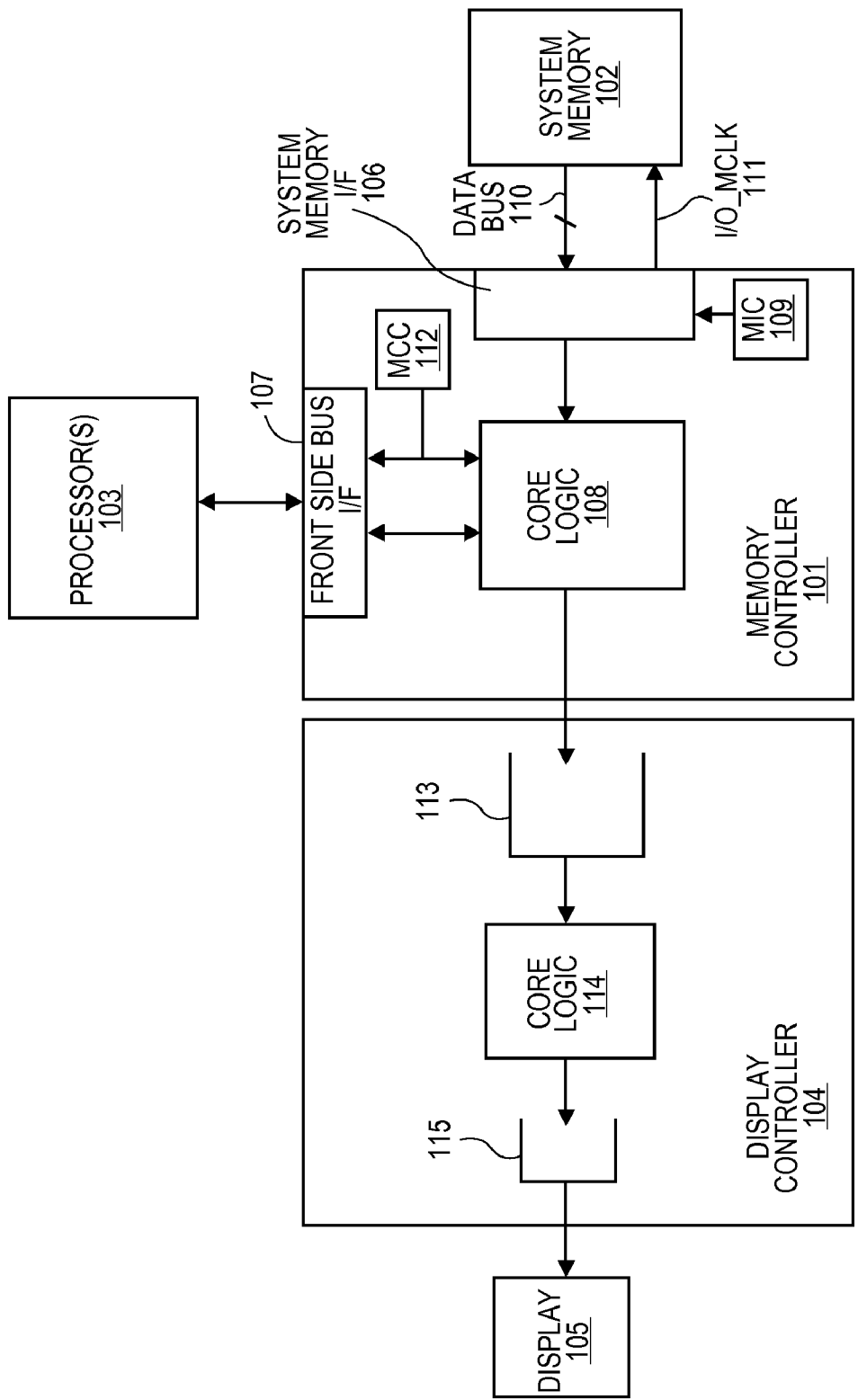

FIG. 1 shows a prior art computing system architecture. According to the architecture of FIG. 1, a memory controller 101 is responsible for presenting data in system memory 102 to both one or more processors 103 and a display controller 104. The particular memory controller 101 observed in FIG. 1 also includes one or more graphics controllers 116, a front side bus interface 107, a system memory interface 106 and core logic 108. The front side bus interface 107 has logic circuitry that controls the memory controller's signaling between the processor(s) 103. The system memory interface 106 has logic circuitry that controls the memory controller's signaling between system memory 111.

The system memory interface 106 is coupled to the system memory 102 with a data bus wiring 110 and memory clock (I/O_MCLK) wiring 111. The memory clock signal that appears on the memory clock wiring 111 is provided by the memory controller 101 and is used to control the rate at which operations are performed by the system memory 102. The memory clock signal is taken directly (or derived from) an output of Memory Interface Clock (MIC) circuitry 109. In an implementation, the MIC circuitry 109 is implemented as a delay locked loop (DLL) that imposes precise delay between a reference clock (not shown in FIG. 1) and one or more output clocks.

The front side bus interface 107 is coupled to the processor(s) 103 by front side bus wiring that carries transactions (e.g., for reads/writes from/to system memory 102) between the memory controller 101 and the processor(s) 103. The memory controller's core logic 108 includes logic circuitry that performs the memory controller's "core" function, namely, responding to requests to read/write data from/to system memory 101 that are sent by the processor(s) 103, the graphics controller(s) 116, the display controller 104 and perhaps one or more "I/O devices" (e.g., a disk drive, a network interface, a bus for attachment to a peripheral device (e.g., a printer) such as the Universal Serial Bus (USB), etc.).

Both the front side bus interface 107, the graphics controller(s) (not shown) and the core logic 108 of the memory controller 101 are clocked by Memory Controller Core (MCC) clock circuitry 112. In an implementation, the MCC clock circuitry is implemented as a phase locked loop (PLL) that "multiplies up" the frequency of a reference clock. The reference clock of the MCC clock circuitry 112 and the reference clock of the MIC circuitry 109 are typically different such that the memory controller 101 has both a "core side" clock domain and a "memory side" clock domain.

The display controller 104 is coupled to the memory controller (typically, through a "display port" interface designed into the memory controller 101 that has not been drawn in FIG. 1 for illustrative convenience). The display controller 104 includes a first, "display" FIFO 113 that stores data that was read from system memory 102 and that will be processed by the display controller's core logic 114 so that it can ultimately be rendered on the display 105 (such as a "flat panel" display (e.g., a thin film transistor (TFT) display)). The display controller's core logic 114 performs the "core" function of the display controller, namely, the processing of data so that it can be "rendered" on the display 105. The display controller 104 also includes a second "clock domain transition" FIFO 115 that permits the data produced by the display controller's core logic 114 to be driven toward the display 105 with a clock that is derived from a different source than the clock used to drive the display core logic 114. The display FIFO 113 fill rate is supposed to be no less than the display FIFO 113 empty rate. The display FIFO 113 empty rate requirement is determined by the display 105 configuration (e.g., display type, pixel resolution, and display refresh rate).

Prior art computing systems (and in particular mobile, battery operated computing systems such as laptop and notebook computers) are designed so as to operate according to different operational states that scale in both functional performance level and electrical power consumption. For instance, according to a "highest" performance and power consumption state (e.g., in which a processor is actively executing instructions), a processor will use its highest possible internal clock speed and will "activate" all of its internal circuitry regions. In a lower performance and power consumption state (e.g., in which a processor is "idling"), the processor will use a lower internal clock speed and may even have certain regions of its circuitry "deactivated". In an even lower performance and power consumption state (e.g., in which a processor is "hibernated" or "sleeping"), the processor reduces to a lowest possible internal clock speed and deactivates significant portions of its internal circuitry.

The system memory 101 can also scale performance and electrical power consumption in order to support the computing system's various performance and power scaled operational states. For instance, system memory 101 may have a higher "auto-refresh" performance and power consumption state in which the system memory 101 needs an active memory clock 111 signal in order to prevent it from losing its internally stored data. The system memory 101 may also have a lower "self refresh" performance and power consumption state in which the system memory 101 does not need an active memory clock 111 signal in order to prevent it from losing its internally stored data.

The display 105, when illuminated with content, also needs to be continuously "refreshed" with data to be displayed. Here, the operation of rendering content on a display 105 can be viewed as the repeated displaying of a "screen's worth" of data. The screen's worth of data may change from screen view to screen view in order to effect visual changes in the matter that appears on the display 105 (and/or, the screen's worth of data may not change, but, still needs to be provided to the display 205 because displays are generally designed so that their visual content will degrade in appearance if they are not resent "new data" that corresponds to the same, continuously displayed imagery). At least when "new content" is continuously being presented on the display 105, the memory controller 101 may need to continuously read new data from system memory 101 and present it to the display controller 104 (which enters it into the display FIFO 113) at a rate high enough to prevent FIFOs 113 and 115 from starving. Note that the data being read from system memory 102 may previously have been processed by the graphics controller(s) (not shown) and written into system memory 102.

An operational mode of the memory controller 101 and display controller 104, referred to as "display mode" (because the display controller 104 is essentially given a sufficiently high bandwidth connection through the memory controller 101 to the system memory 102), is used to support the continuous ("streaming") presentation of new content on the display 105. It is moreover possible that, while the memory controller 101 and display controller 104 are in the display mode, the processor(s) 103 are in a reduced performance and power consumption state in which requests will not be presented to the memory controller 101 over the front side bus for reads/writes from/to system memory 102. Here, the display 105 should be kept updated even if the processor(s) 103 are in a low performance and power consumption mode (such as no clocks, or very low frequency clocks, running, and/or many functional blocks disabled)

Unfortunately, the memory controller 101 and display controller 104 of the prior art computing system of FIG. 1 were not specifically designed to substantially reduce the power consumption of the computing system's integrated graphics mode when the memory controller's front side bus was essentially inactive. Specifically, the MCC clock 112 was "always on" which essentially caused the memory controller's graphics controller(s) and core logic circuitry 108 as well as the display controller's display FIFO 113 (and perhaps parts its core logic 114) to continuously consume electrical power.

FIGURES

Figure 2:
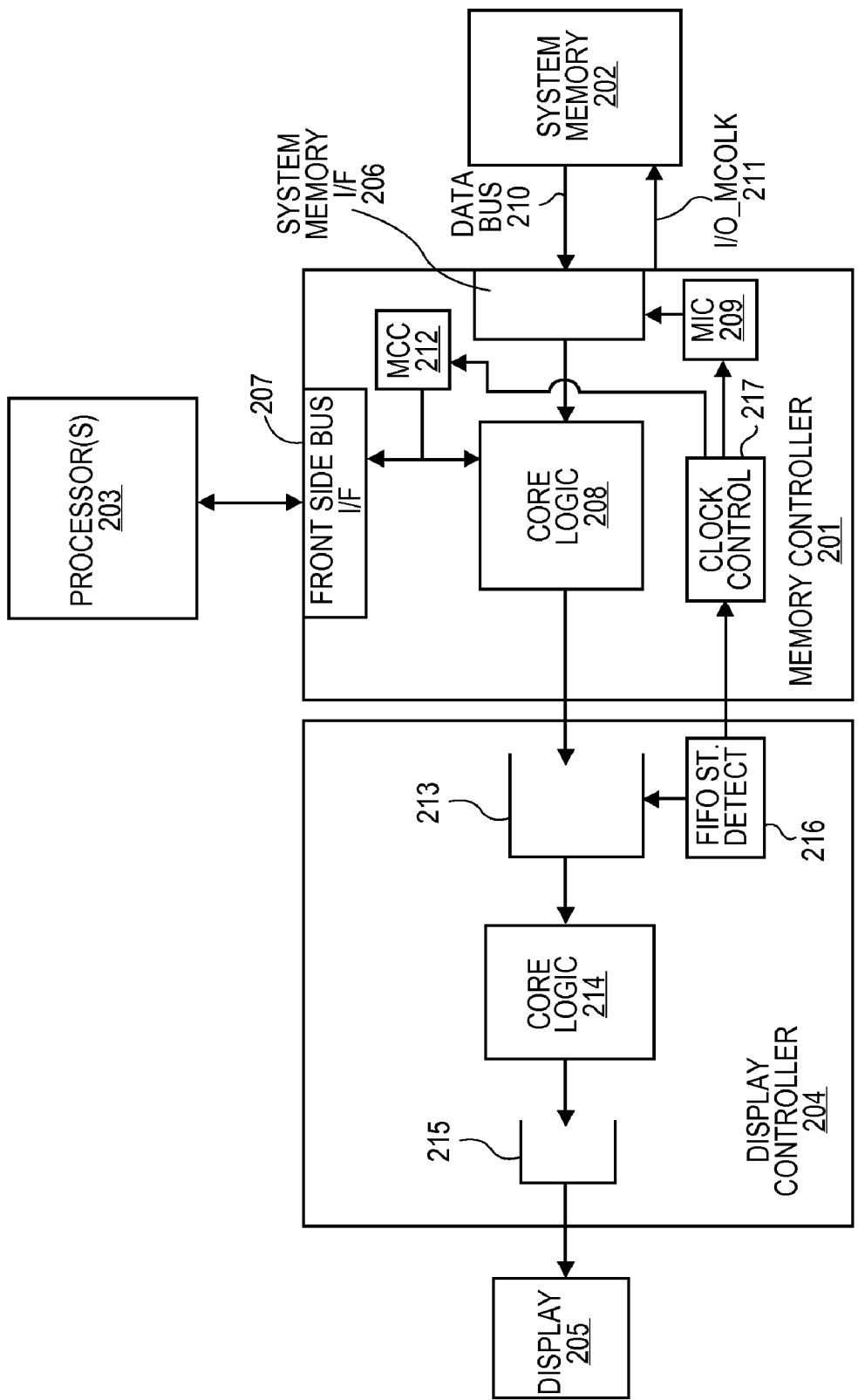
Figure 3:
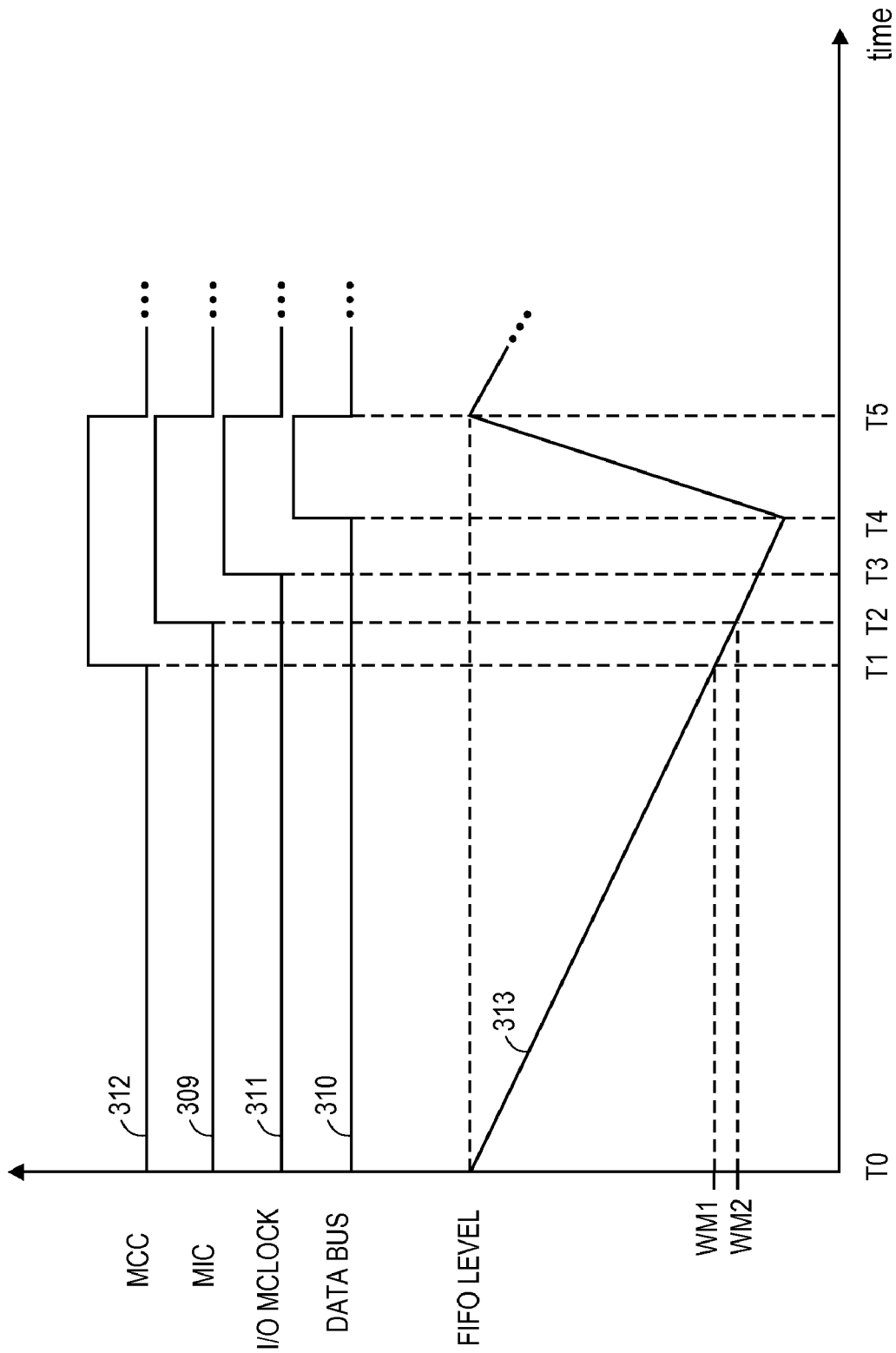
Figure 4:
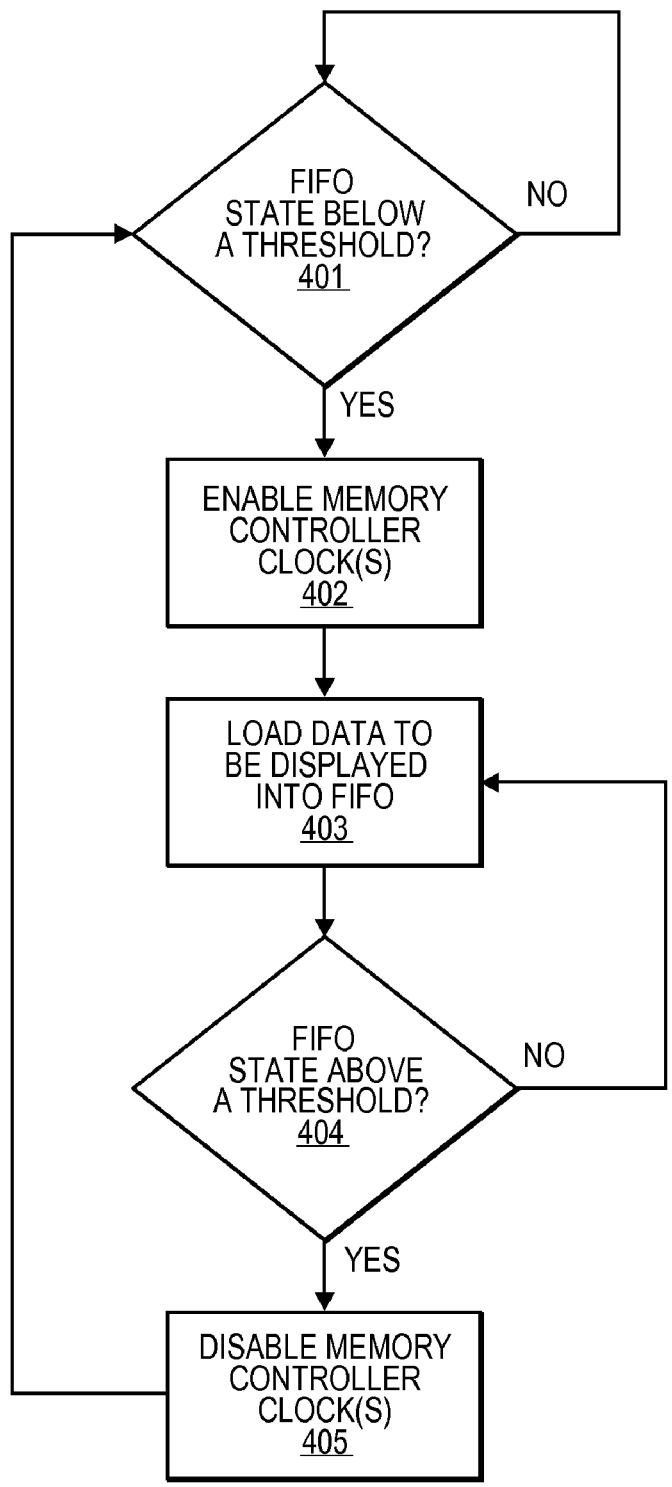

The present invention is illustrated by way of example and not limitation in the figures of the accompanying drawings, in which like references indicate similar elements and in which:

FIG. 1 shows a prior art computing system;
FIG. 2 shows an improved computing system;
FIG. 3 shows a timeline of a process performed by the improved computing system of FIG. 2;
FIG. 4 shows a process performed by the improved computing system;
FIG. 5 shows a discrete graphics controller implementation.

DETAILED DESCRIPTION

FIG. 2 shows one embodiment of an improved memory controller 201 and display controller 204 design that strives to optimize the power consumption efficiency of the display mode when little or no memory read/write requests are expected over the front side bus (except perhaps those targeted for the display 205). According to the design of FIG. 2, the display FIFO 213 of the graphics controller 204 is designed to be large enough so that the memory controller 201 and system memory 202 can be kept in reduced power consumption states for long periods of time while the display FIFO 213 feeds the display controller's core logic circuitry 214.

Specifically (according to one embodiment), over the expanse of a single display refresh cycle, except for a relatively brief period of time in which an entire display refresh cycle's worth of data is read from system memory 201 and entered into the display FIFO 213, the memory controller's core logic circuitry 208 is deactivated through the disabling of the MCC clock 212 and the system memory 202 is placed in "self refresh" mode. The graphics controller(s) may also be deactivated. During the relatively brief period of time in which an entire refresh cycle's worth of data is entered into the display FIFO 213, the MCC clock 212 is enabled and the system memory is placed in "auto refresh" mode.

An embodiment of the scheme can be better understood in reference to FIGS. 2 and FIG. 3 together. Referring to FIGS. 2 and 3, at time T0, the display FIFO 213 is "full" or otherwise contains enough data to refresh an entire screen's worth of visual content. Starting in this state, note that the MCC clock 212, 312 is "off", the MIC clock 209, 309 is "off", the memory clock 211, 311 is "off", and the memory's data bus 210, 310 is quiet (i.e., substantive data is not being read from system memory 202).

Because the MCC clock 212, 312 is "off" the memory controller's core logic 208 and graphics controller(s) 216 are not consuming large amounts of electrical power. Because the MIC clock 209, 309 is also "off" and because the memory clock 211, 311 is derived from the MIC clock 209, 309, a memory clock 211, 311 is not being supplied to the system memory 202 by the memory controller 201. Because the memory clock 211, 311 is "off", the system memory 202 is in "self-refresh" mode (i.e., the system memory 202 does not use an external clock in preventing its internal data from being lost). Therefore as of time T0, the display FIFO 213 is "full" (or otherwise contains enough data to refresh an entire screen's worth of visual content), the memory controller's core logic 208 and graphics controller(s) are in a reduced power consumption state, and, the system memory 202 is in "self refresh" mode. This essentially corresponds to a situation where both the memory controller 201 and the system memory 202 are in reduced power consumption states.

From time T0 to T1 data is read from the display FIFO 213 for the purposes of refreshing the content rendered on the display 205. During this time period, the memory controller 201 and system memory 202 are in their reduced power consumption states as described above. At time T1, however, FIFO state detection logic circuitry 216 detects that the display FIFO 213 state has fallen to a first "watermark level" WM1. The WM1 level essentially indicates that the display FIFO 213 is becoming sufficiently empty and will soon need more data if it is to continue supporting the rendering of new content on the display 205.

As such, notice of the WM1 level being reached is directed from the FIFO state detection logic circuitry 216 to clock control logic circuitry 217 on the memory controller 201. In response, the clock control logic circuitry 217 "wakes up" the MCC clock 212, 312 such that it emits its one or more clock signals. In the particular implementation being discussed herein, the MCC clock 212, 312 and the logic circuitry that runs from the MCC clock 212, 312 (the front side bus interface logic circuitry 207, the graphics controller(s) 216 and core logic 208) take a longer amount of time to wake up" than the MIC clock 209, 309 and the logic circuitry that runs from the MIC clock 209, 309 (the system memory interface logic circuitry 206 and the system memory 201 (when in auto-refresh mode)).

As such, the system memory 202 is allowed to stay in its lower power state (self refresh mode) for a longer period of time (T0 to T2) than the memory controller core logic circuitry 208 and graphics controller(s) 216 (T0 to T1). At time T2, a second watermark level WM2 is detected by the FIFO state detection logic circuitry 216. Notification of the second watermark level WM2 is sent to the clock control circuitry 217. In response, the clock control circuitry 216 "wakes up" the MIC clock 209, 309; which, in turn, causes the memory clock 211, 311 to be generated at time T3. The generation of the memory clock 211, 311 at time T3 is at least part of the system memory's exit from self refresh mode and entry into auto refresh mode after the second watermark WM2 is detected.

Therefore, after time T4, the memory controller 201 and system memory 202 will have both been converted from a lower performance and power consumption state to a higher performance and power consumption state. From time T4 to T5, data is read from the system memory 201 (signified by the data bus 210, 310 being "busy") sufficient to re-fill the display FIFO 213 by time T5. At this point, the MCC clock 212, 312 and MIC clock 209, 309 are turned "off" and the process repeats. Note that from time T0 to time T5 data to be processed and displayed is continuously being read from the display FIFO 213 (e.g., if the display FIFO 213 was not refilled between times T4 and T5, it would run out of data by time T5).

Note also that the particular description above was oriented toward a particular implementation in which the amount of data read from time T4 and T5 and the size of the display FIFO 213 corresponds to an entire refresh cycle's worth of data (i.e., a screen's worth of data). Said another way, time T0 to time T5 corresponds to the refresh cycle time of the display 205 such that there is one display 205 re-fill procedure per display refresh cycle. In alternative implementations there may be less than one display FIFO re-fill per display refresh cycle (e.g., time T0 to T5 corresponds to two refresh cycles and the display FIFO 213 is large enough to hold two refresh cycles worth of data), or, more than one display FIFO re-fill per display refresh cycle (e.g., time T0 to T5 corresponds to one half of a refresh cycle and the display FIFO 213 is large enough to hold one half of a refresh cycle's worth of data).

Note also that, other than activating/deactivating the MCC and MIC clocks as described above, the MCC and MIC clocks themselves may be permitted to continuously operate, but, one or more output clock signals generated from them are "squelched" so as not to reach the circuitry there are designed to time the operation of (e.g., a logic gate could be inserted between the MCC clock circuitry 212 and the core logic circuitry 208 that squelches the core logic's clock input). Also, given that the display mode process may be performed while the processor(s) 203 are not supposed to send system memory read requests or system memory write requests to the memory controller 201, additional logic circuitry on the memory controller (not shown in FIG. 2) may be used to detect the operational state(s) of the processor(s) 203 (e.g., through the processor(s) broadcasting of entry into such state(s)) that correspond to this behavior on the part of the processor(s).

FIG. 4 shows one embodiment of a high level methodology of the processing described above. It can be assumed that data is being continuously read from the display FIFO through the process of FIG. 4. According to the process of FIG. 4, when a display FIFO is recognized 401 as being below a certain threshold (e.g., the first watermark level WM1 of FIG. 3), one or more memory controller clocks are enabled or their output clock signals are otherwise permitted to reach the circuitry they are designed to drive 402. These one or more clocks may drive one or more of: a memory controller's graphics controller(s), core logic circuitry (or a portion thereof), system memory interface circuitry, front side bus interface circuitry and a system memory. Data to be processed by a display controller and displayed by a display is then read from the system memory and loaded into the FIFO 403. Once the FIFO state reaches a higher threshold (e.g., it is filled up) 404, the process returns to monitoring for the FIFO state to reach the lower threshold 401.

It is also possible that the front side bus logic circuitry could be replaced with data-link layer and physical layer networking circuitry in computing systems where the processor(s) 203 are coupled to the memory controller 201 by way of a network containing point-to-point links.

FIG. 2 depicts one embodiment of a memory controller 201 having an integrated graphics controller (not shown). Graphics controllers that, architecturally speaking, are not integrated with a memory controller exist and are presently in use, and, may be referred to as discrete graphics controllers. FIG. 5 shows an embodiment of an implementation of the present teachings that is adapted for a discrete graphics controller 501.

A graphics controller, whether integrated with a memory controller or discrete, is typically capable of processing graphics related instructions so that the processor(s) of the corresponding computing system do not have to. That is, a purpose of the graphics controller is to "off-load" graphics related work from the processor(s) so that the processor(s) 103 can entertain other tasks.

According to the depiction of FIG. 3, such instructions are received by the graphics controller 501 (either directly from the processor(s) or indirectly from a memory controller 503) through a bus interface 507. The core logic 508 of the graphics controller 501 is responsible for processing graphics related instructions received through bus interface 507 and writing them into local memory 502. Here, local memory 502 is often implemented as the graphics controller's own "private" memory. After the data processed by the graphics controller's core logic 508 is written into local memory 502, it is eventually read back from local memory 502 by the core logic 508 which then enters it into the display FIFO 513 of a display controller 504.

In this respect, a design and process can be effected which is analogous to that described above with respect to FIGS. 2, 3 and 4. Specifically, it is altogether possible that new instructions are not received at bus interface 507 for extended periods of time thereby permitting core logic 508 to be essentially deactivated save for brief moments of time while data is read from local memory 502 and entered into display FIFO 513, where, the amount of data and the size of FIFO 513 is sufficient to supply an entire display 505 refresh cycle (or, e.g., two display refresh cycles, half a refresh cycle, etc.).

During the brief moment of time while data is being read from local memory 502, the graphics controller clock circuitry 512 and memory interface clock circuitry 509 are activated by the clock control circuitry 517 (responsive to one or more watermark levels detected by detection circuitry 516) such that, similar to the approach described above with respect to FIGS. 2, 3 and 4, the graphics controller 501 and local memory 502 are in a high performance, high power consumption state. After this brief period of time (when display FIFO 513 has been supplied with a sufficient amount of data to feed the display for an extended period of time and the detection circuitry 516 detects this event), the clock control circuitry 501 triggers the deactivation of the graphics controller clock circuitry 512 and the memory interface clock circuitry 509.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing information in a form readable by a machine (e.g., a computer). For example, a machine readable medium includes read only memory (ROM); random access memory (RAM); magnetic disk storage media; optical storage media; flash memory devices; etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:

recognizing that a state of a FIFO that holds data to be used to display content on a display has reached a first threshold;

operating logic circuitry of said memory controller responsive to said state to cause at least a portion of a memory controller's core logic circuitry and central processing unit interface circuitry of said memory controller to receive their respective clocks by turning on one or more signals provided by a phase locked loop (PLL) circuit, and, operating logic circuitry of said memory controller responsive to said state to cause a memory that is controlled by said memory controller to use a second clock that is generated by a delay locked loop (DLL) within said memory controller;

reading additional data to be used to display content on said display from said memory and putting said additional data into said FIFO; and, causing said at least a portion of said memory controller's core logic circuitry and said central processing unit interface circuitry of said memory controller to fail to receive said respective clocks by turning off said one or more signals provided by said PLL circuit and causing said memory to fail to receive said second clock.

2. The method of claim 1 wherein said memory is a system memory, said method further comprising performing said method while read requests for said system memory and write requests for said system memory are not sent to said memory controller by a said central processing unit that communicates to said memory controller through said central processing unit interface circuitry.

3. The method of claim 1 wherein said turning on said one or more signals occurs before said memory is caused to use said second clock.

4. The method of claim 3 wherein said one or more signals - and said second clock are turned off at substantially the same time.

5. The method of claim 1 wherein said additional data is coextensive with a refresh cycle's worth of data for said display.

6. The method of claim 1 wherein said additional data is less than a refresh cycle's worth of data for said display.

7. The method of claim 1 wherein said additional data is greater than or equal to a refresh cycle's worth of data for said display.

8. The method of claim 1 wherein said memory controller includes a graphics controller that is clocked from said PLL.

9. A controller, comprising:

wiring to transport notification that a display controller FIFO that holds data to be used to display content on a display has reached a threshold;

first control circuitry to cause both: i) logic circuitry within said controller's core, and, ii) interface circuitry within said controller to begin to receive their respective clocks in response to said notification, said logic circuitry to transport data read from a memory toward said FIFO, a PLL coupled to said logic circuitry and said interface circuitry, said interface circuitry to enable said controller to communicate with a central processing unit;

second control circuitry to cause said memory to use a second clock provided by a delay locked loop within said controller in response to said notification.

10. The controller of claim 9 further comprising logic circuitry to detect entry of said central processing unit into a state in which said central processing unit will not send requests to said controller.

11. The controller of claim 9 wherein said memory is a system memory.

12. The controller of claim 9 wherein said controller is a graphics controller and said memory is said graphics controller's local memory.

13. A computer, comprising:

a flat panel display;

a display controller coupled to said flat panel display;

a memory controller coupled to said display controller, said display controller comprising:

a) wiring to transport notification that a FIFO that holds data to be used to display content on a display has reached a threshold;

b) first control circuitry to cause core logic circuitry within said memory controller and central processing unit interface circuitry within said memory controller to begin to receive their respective clocks in response to said notification, said logic circuitry to transport data read from system memory toward said FIFO, said respective clocks provided by a PLL; and c) second control circuitry to cause a system memory to use another clock provided by a DLL within said memory controller in response to said notification.

14. The computer of claim 13 further comprising logic circuitry to detect entry of said central processing unit into a state in which said central processing unit will not send system memory read request or system memory write requests to said memory controller.

* * * * *